(12) United States Patent
McCusker et al.

(10) Patent No.: US 6,662,939 B1
(45) Date of Patent: Dec. 16, 2003

(54) FRAMEWORK FOR BELT CONVEYOR

(75) Inventors: Daniel McCusker, Omagh (GB); Neil Suitor, Clougher (GB)

(73) Assignee: Powerscreen International Distribution Limited, County Tyrone (IE)

( * ) Notice: Subject to any disclaimer, the term of this patent is extended or adjusted under 35 U.S.C. 154(b) by 0 days.

(21) Appl. No.: 09/890,468
(22) PCT Filed: Jan. 31, 2000
(86) PCT No.: PCT/GB00/00243
§ 371 (c)(1), (2), (4) Date: Sep. 10, 2001
(87) PCT Pub. No.: WO00/44652
PCT Pub. Date: Aug. 3, 2000

(30) Foreign Application Priority Data

Feb. 1, 1999 (GB) .............................. 9902116

(51) Int. Cl.$^7$ .............................. B65G 21/10
(52) U.S. Cl. .............................. 198/861.1; 198/316.1; 198/317; 198/632; 198/861.4; 414/523
(58) Field of Search .............................. 198/316.1, 317, 198/632, 861.2, 861.4, 861.5; 414/523, 528

(56) References Cited

U.S. PATENT DOCUMENTS 4,955,955 A * 9/1990 Driear ........................ 198/318
5,013,208 A * 5/1991 Grieshop ..................... 414/526
5,538,388 A * 7/1996 Bergkamp et al. .......... 414/523

FOREIGN PATENT DOCUMENTS

GB      2351719 A   *  1/2001   ........... B65G/41/00

* cited by examiner

Primary Examiner—Kathy Matecki
Assistant Examiner—Mark A. Deuble
(74) Attorney, Agent, or Firm—Ronald E. Greigg

(57) ABSTRACT

A framework for a belt conveyor comprising a base structure having a three point mounting arrangement in which the mountings are in a substantial triangular displacement with one upper mounting and two lower mountings. A boom structure has its inward end pivotally connected to the base structure through the three mountings and has an elongate boom member and an elongate support member. The boom member is pivoted to the upper mounting with the support member being pivoted to one of the lower mountings. The support member underlies the boom member and towards its mounted inward end is cranked outwardly and has outer end pivotally connected to the boom structure. A mounting plate is provided near to the crank between which and the second of the lower mountings, a ram and cylinder arrangement is connected. The mountings are displayed angularly to enable the boom structure to be capable of articulation between an outbound upwardly inclined horizontal orientation and an inward substantially vertical orientation.

20 Claims, 3 Drawing Sheets

FRAMEWORK FOR BELT CONVEYOR

CROSS-REFERENCE TO RELATED APPLICATIONS

This application is a 35 USC 371 application of PCT/GB 00/00243 filed on Jan. 31, 2000.

BACKGROUND OF THE INVENTION

1. Field of the Invention

This invention relates to a framework for a belt conveyor, the framework being mountable on, and in use to extend laterally from, a material handling apparatus, normally used in a quarry or like location for processing discrete materials.

2. Description of the Prior Art

Belt conveyor frameworks have been proposed heretofore. A general problem with material handling apparatus is that periodically the apparatus has to be moved to a different site requiring the apparatus to be moved along public roads. There are regulations governing the movement of such apparatus on public roadways, particularly the width of vehicles and their loads and therefore such laterally extending frameworks must be demounted from, or folded inboard of such apparatus so that the overall width of the apparatus is within the stated requirements.

OBJECTS AND SUMMARY OF THE INVENTION

An object of the present invention is to provide a framework for mounting on a material handling apparatus and thereon being capable of being folded inboard in a manner to comply with overall width requirements of governing regulations.

Accordingly, the present invention is a framework for a belt conveyor comprising a base structure having a three point mounting arrangement in which the mountings are in a substantial triangular displacement with one upper and two lower mountings, a boom structure at its inward end being pivotally connected to the base structure through the three mountings, the boom structure having an elongate boom member and an elongate support member, the boom member being pivoted to the upper mounting with the support member being pivoted to one of the lower mountings, the support member underlying the boom member and towards its mounted inward end is cranked outwardly and at its outer end pivotally connected to the boom structure, a mounting plate being provided near to the crank between which and the second of the lower mountings, a ram and cylinder arrangement is connected, the mountings being displayed angularly to enable the boom structure to be capable of articulation between an outboard upwardly inclined horizontal orientation and an inward substantially vertical orientation.

Preferably, pins secure the boom member, the support member and the ram or cylinder of the arrangement to their respective mountings, the axes of the pins being angularly displayed with the axes of the pins for the boom member and the support member being substantially co-axial.

Preferably, also the axis of the ram and cylinder arrangement in the outboard position is substantially parallel to the axis of the boom member. The ram is desirably capable of length adjustment. The outer ends of the ram and of the cylinder of the ram and cylinder arrangement each beneficially incorporates a swivel joint to allow for swivel movement during articulation of the boom structure.

Preferably further, the outer end of the boom member is bifurcated and mounts a conveyor roller between the outer ends of the bifurcated arms, the roller being transversely of the boom member. The base member is elongate and preferably mounts a conveyor roller transversely thereof at its outer end with a series of idling rollers arranged parallel thereto in an inclined plane towards its inner end whereat the three mountings are provided. A belt conveyor is desirably entrained around the two conveyor rollers, the upper flight of the belt conveyor passing over the series of idling rollers. A feed boot is beneficially provided on the base structure above the idling rollers. The outer end of the support member is desirably bifurcated with an idling roller mounted between its bifurcated arms and over which idling roller the lower flight of the belt conveyor passes.

BRIEF DESCRIPTION OF THE DRAWINGS

The foregoing and other objects and advantages will be apparent from the description contained herein below, taken with the accompanying drawings, in which.

DESCRIPTION OF THE PREFERRED EMBODIMENTS

Figure 1:
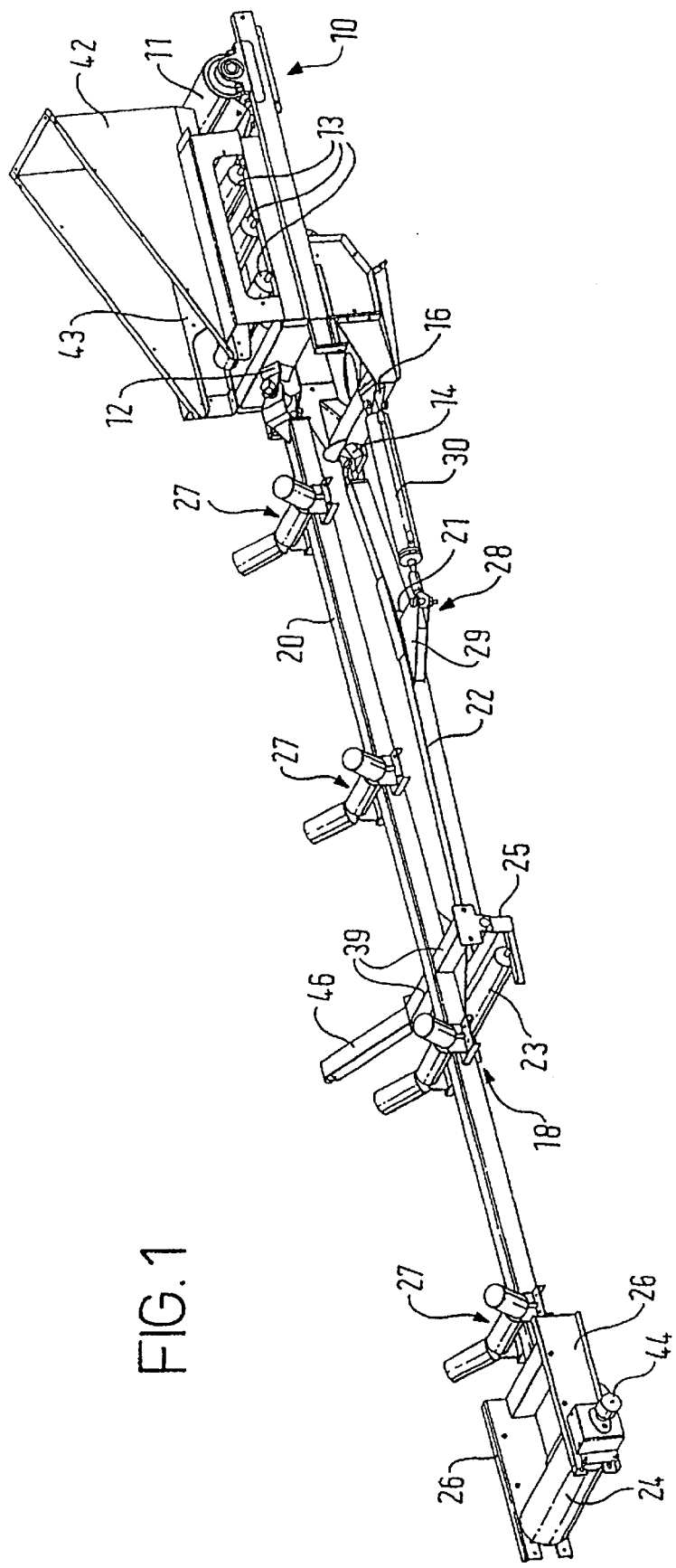
FIG. 1 shows a perspective view of the framework according to the present invention from one side and above and showing the framework in an outboard position.
Figure 4:
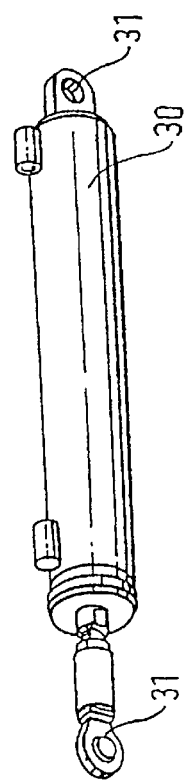
FIG. 4 is a perspective view of a ram and cylinder arrangement used in the framework.
Figure 2:
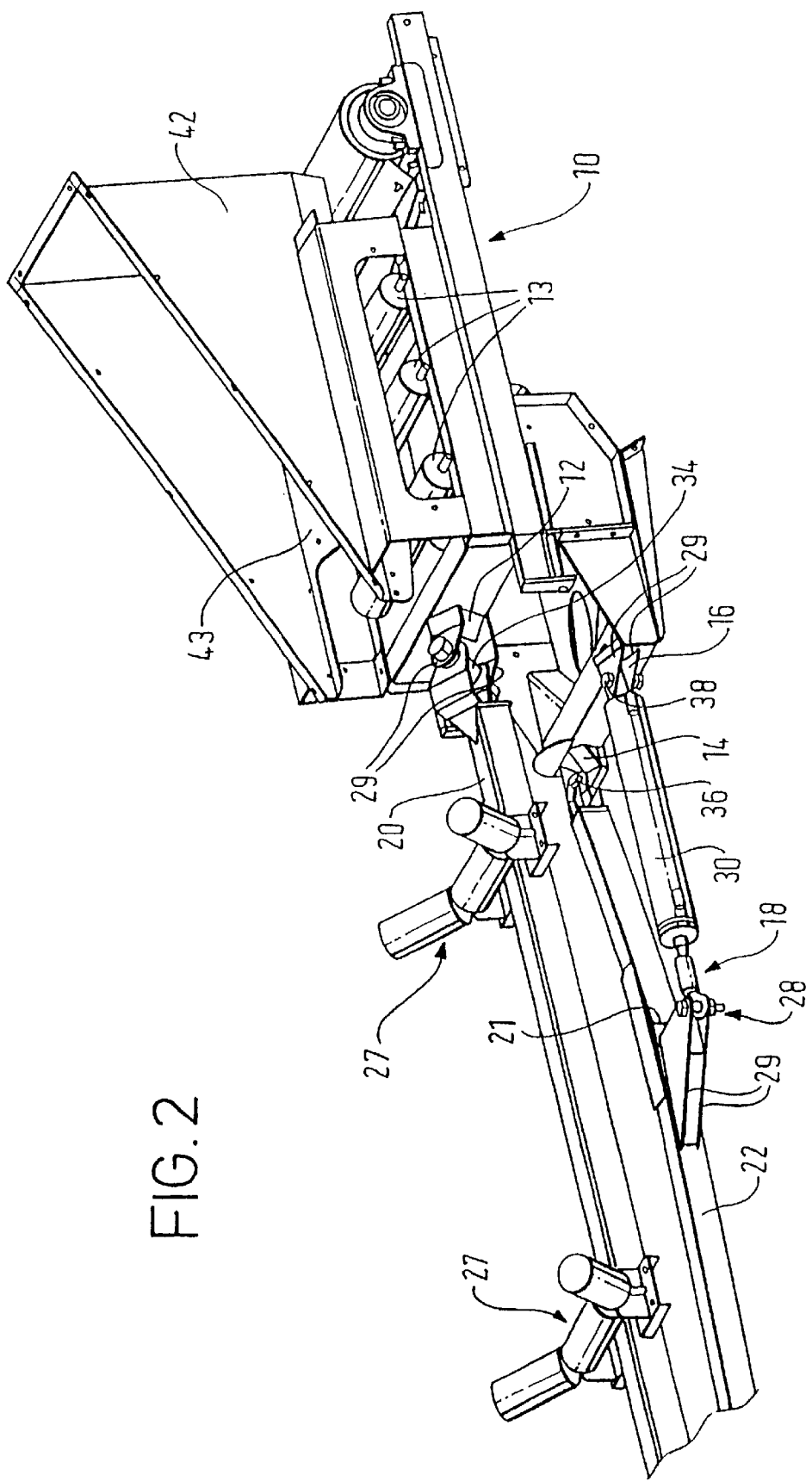
FIG. 2 shows an enlarged perspective view of a base structure of the framework shown in FIG. 1.

Referring to the drawings, a framework for a belt conveyor comprises a base structure 10 having a three point mounting arrangement in which the mountings are in a substantial triangular displacement with one upper mounting 12 and two lower mountings 14, 16. The base structure 10 is elongate and mounts a conveyor roller 11 transversely thereof at its outer end with a series of three idling rollers 13 arranged parallel thereto in an inclined plane towards its inner end whereat the three mountings 12, 14, 16 are provided.

A boom structure 18 is pivotally connected at its inward end to the base structure 10 through the three mountings 12, 14, 16. The boom structure 18 has an elongate boom member 20 and an elongate support member 22. The boom member 20 is pivoted to the upper mounting 12 with the support member 22 being pivoted to one of the lower mountings 14. The support member 22 underlies the boom member 20 and towards its mounted inward end is cranked outwardly at 21 and at its outer end is pivotally connected to the boom structure 18. The outer end of the boom member 20 is bifurcated and mounts a conveyor roller 24 between the outer ends of the bifurcated arms 26, the roller 24 being transversely of the boom member 20. A series of four troughing rollers 27 are provided in a lengthwise spaced relationship transverse of the boom member 20. Each troughing roller 27 is in three parts comprising a central roller, and two outer rollers diverging away from the central roller, the purpose of which is to trough the upper flight of a belt conveyor passing thereover.

Figure 3:
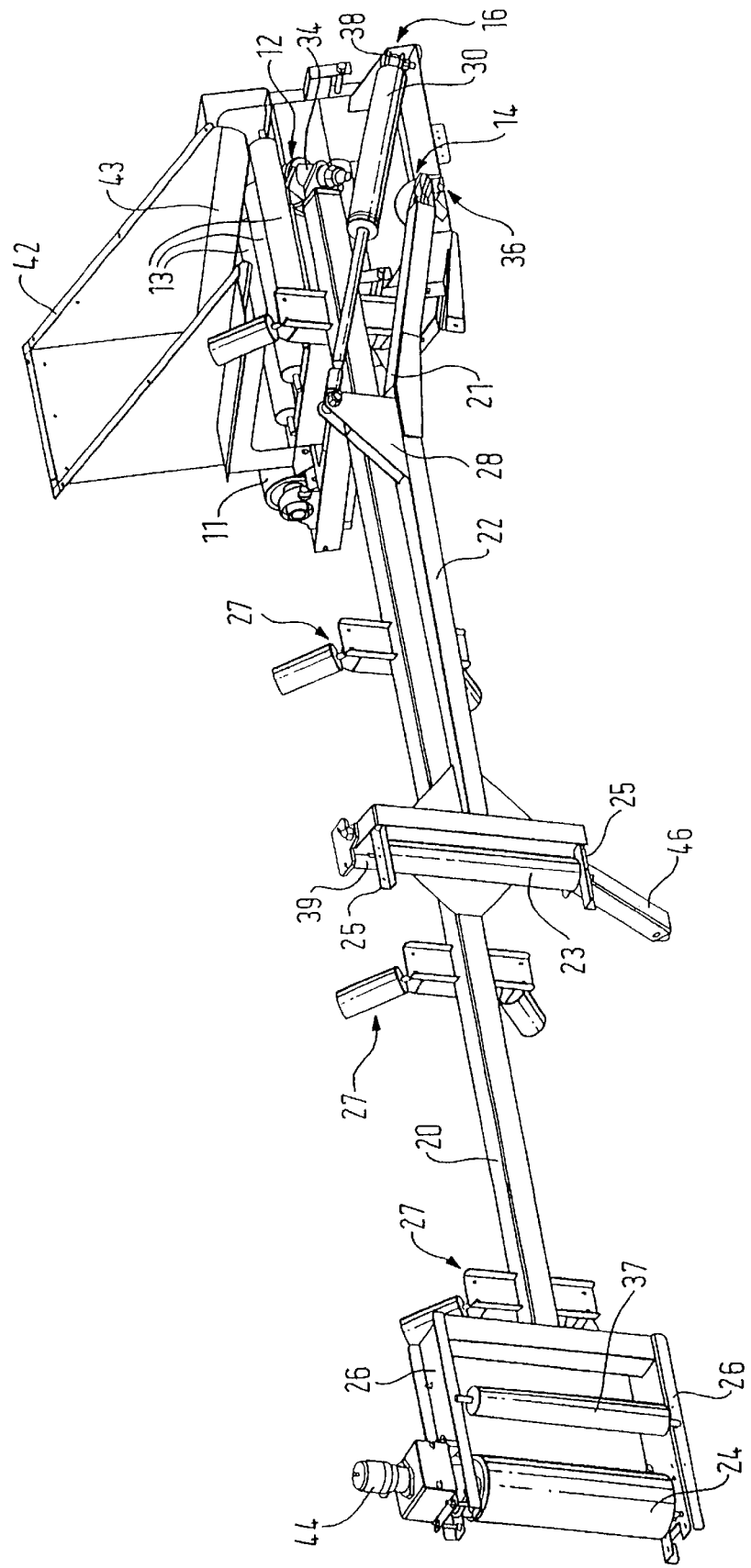
FIG. 3 shows a perspective view of the framework from the side and above and showing the framework in an inboard position.

A mounting plate 28 is provided near to the crank in the support member 22 between which mounting plate 28 and the second of the lower mountings 16, a double acting ram and cylinder arrangement 30 is connected. The arrangement 30 is connected in circuit with a hydraulic fluid supply. The mountings, 12, 14 16 are displayed angularly to enable the boom structure 18 to be capable of articulation laterally through substantially 90° between an outboard upwardly inclined horizontal orientation as shown in FIG. 1 and in inboard substantially vertical orientation as shown in FIG. 3 i.e. twisting through substantially 90°. Pins 34, 36, 38 secure the boom member 20, the support member 22 and the ram of the ram and cylinder arrangement 30 to their respective mountings 12,14 16, the axes of the pins 34, 36, 38 being angularly displayed with the axes of the pins, 34, 36 for the boom member 20 and the support member 22 being substantially co-axial. The mountings 12, 14, 16 and mounting plate 28 have each two vertically spaced parallel apertured cheeks 29.

The axis of the ram and cylinder arrangement 30 is substantially parallel to the axis of the boom member 20 in the outboard position. The ram is capable of length-adjustment. The outer ends of the ram and of the cylinder of the ram and cylinder arrangement 30 each incorporates a swivel joint 31 to allow for swivel movement during articulation of the boom structure 12.

A belt conveyor (not shown) is entrained around the two conveyor rollers 11, 24, the upper flight of the belt conveyor passing over the series of idling rollers 13. A feed boot 42 is provided on the base structure 10 above the idling rollers 13. A flexible skirting 43 is provided along each of the three walls of the feed boot 42 to close off the space between the feed boot 42 and the belt conveyor and to direct discrete material onto the belt conveyor. The outer end of the support member 22 is bifurcated with an idling roller 23 mounted between its bifurcated arms 25 and over which idling roller 23 the lower flight of the belt conveyor passes. A transverse arm 39 extends transversely from each side of the boom member 20 at substantially midway of its length and the bifurcated arms 25 are connected thereto. Also, an idling roller 37 is provided mounted under the bifurcated arms 26, and over which the lower flight of the belt conveyor passes. This idling roller 37 acts as a jockey roller to keep the belt conveyor in contact with the roller 24 which is driven through an hydraulic motor 44 integrated into the hydraulic fluid circuit.

A cranked extension 46 extends from the transverse arm 39 on the end thereof nearer to the apparatus in the direction of articulation, the outer end of the extension 46 being for securement to the apparatus when the boom structure 18 is articulated inboard of the apparatus.

In use, with the framework fitted to a material handling apparatus and the boom member 20 inboard thereof, the extension 46 is disconnected from the apparatus and the boom member 20 is articulated into the outboard position by the ram and cylinder arrangement being retracted. Once positioned, the belt conveyor is ready for use and with the hydraulic motor 44 energised to rotate the belt conveyor and discrete material fed into the feed boot 42, it is passed thereup and discharged at the upper end thereof. When the apparatus requires to be moved, with the belt conveyor stopped, the arrangement is extended to move the boom member 20 inboard of the apparatus and the extension is secured to the apparatus. The swivel joint 31 allows the outer ends of the arrangement 30 to swivel and the ram can rotate within the cylinder.

The invention described above is advantageous over known frameworks in that it is simple and cheaper to construct and does not involve universal joints but rather simple universal pivots.

Variations and modifications can be made without departing from the scope of the invention above described and as claimed hereinafter.

We claim:

1. A framework for a belt conveyor comprising a base structure having a three point mounting arrangement in which the mountings are in a substantial triangular displacement with one upper and two lower mountings, a boom structure at an inward end pivotally connected to said base structure through said three mountings, said boom structure including an elongate boom member and an elongate support member being pivoted to one of said lower mountings, said support member underlying said boom member and towards its mounted inward end being cranked outwardly and at its outer end pivotally connected to said boom structure, a mounting plate mounted near the crank, a ram and cylinder arrangement connected between said mounting plate and the second of said lower mountings, said mountings being displayed angularly to enable the boom structure to be capable of articulation between an outboard generally horizontal orientation and an inboard substantially vertical orientation, and further comprising pins securing said boom member, said support member and said ram or cylinder of said arrangement to their respective mountings, the axes of said pins being angularly displayed with the axes of said pins for said boom member and said support member being substantially parallel.

2. A framework for a belt conveyor as claimed in claim 1 wherein the outer ends of said ram and of said cylinder of said ram and cylinder arrangement each incorporates a swivel joint to allow for swivel movement during articulation of said boom structure.

3. A framework for a belt conveyor as claimed in claim 2 wherein said base structure is elongated and further comprising a conveyor roller mounted on said base structure transversely thereof at its outer end, and a series of idling rollers mounted parallel to said conveyor roller in an inclined plane towards the inner end of said base structure whereat the three mountings are provided.

4. A framework for a belt conveyor as claimed in claim 1 wherein the axis of said ram and cylinder arrangement in the outboard position is substantially parallel to the axis of said boom member.

5. A framework for a belt conveyor as claimed in claim 4, further comprising means for adjusting the length of said ram.

6. A framework for a belt conveyor as claimed in claim 1 wherein the outer ends of said ram and of said cylinder of said ram and cylinder arrangement each incorporates a swivel joint to allow for swivel movement during articulation of said boom structure.

7. A framework for a belt conveyor as claimed in claim 1 wherein the outer end of said boom member is bifurcated, said framework further comprising a conveyor roller mounted between outer ends of bifurcated arms, said roller being mounted transversely of said boom member.

8. A framework for a belt conveyor as claimed in claim 1, wherein the boom structure, when in its outboard position, positions the conveyor belt with an upward incline.

9. A framework for a belt conveyor comprising a base structure having a three point mounting arrangement in which the mountings are in a substantial triangular displacement with one upper and two lower mountings, a boom structure at an inward end pivotally connected to said base structure through said three mountings, said boom structure including an elongate boom member and an elongate support member being pivoted to one of said lower mountings, said support member underlying said boom member and towards its mounted inward end being cranked outwardly and at its outer end pivotally connected to said boom structure, a mounting plate mounted near the crank, a ram and cylinder arrangement connected between said mounting plate and the second of said lower mountings, said mountings being displayed angularly to enable the boom structure to be capable of articulation between an outboard generally horizontal orientation and an inboard substantially vertical orientation, wherein the axis of said ram and cylinder arrangement in the outboard position is substantially parallel to the axis of said boom member.

10. A framework for a belt conveyor as claimed in claim 9, further comprising means for adjusting the length of said ram.

11. A framework for a belt conveyor as claimed in claim 10 wherein the outer ends of said ram and of said cylinder of said ram and cylinder arrangement each incorporates a swivel joint to allow for swivel movement during articulation of said boom structure.

12. A framework for a belt conveyor as claimed in claim 9 wherein the outer ends of said ram and of said cylinder of said ram and cylinder arrangement each incorporates a swivel joint to allow for swivel movement during articulation of said boom structure.

13. A framework for a belt conveyor as claimed in claim 9, wherein the boom structure, when in its outboard position, positions the conveyor belt with an upward incline.

14. A framework for a belt conveyor comprising a base structure having a three point mounting arrangement in which the mountings are in a substantial triangular displacement with one upper and two lower mountings, a boom structure at an inward end pivotally connected to said base structure through said three mountings, said boom structure including an elongate boom member and an elongate support member being pivoted to one of said lower mountings, said support member underlying said boom member and towards its mounted inward end being cranked outwardly and at its outer end pivotally connected to said boom structure, a mounting plate mounted near the crank, a ram and cylinder arrangement connected between said mounting plate and the second of said lower mountings, said mountings being displayed angularly to enable the boom structure to be capable of articulation between an outboard generally horizontal orientation and an inboard substantially vertical orientation, wherein said base structure is elongated and further comprising a conveyor roller mounted on said base structure transversely thereof at its outer end, and a series of idling rollers mounted parallel to said conveyor roller in an inclined plane towards the inner end of said base structure whereat the three mountings are provided.

15. A framework for a belt conveyor as claimed in claim 14, further comprising a conveyor entrained around said two conveyor rollers, the upper flight of the belt conveyor passing over said series of idling rollers.

16. A framework for a belt conveyor as claimed in claim 15 wherein the outer end of the support member is bifurcated, and an idling roller is mounted between its bifurcated arms and over which idling roller the lower flight of said belt conveyor passes.

17. A framework for a belt conveyor as claimed in claim 15 further comprising a feed boot mounted on said base structure above said idling rollers.

18. A framework for a belt conveyor as claimed in claim 14 further comprising a feed boot mounted on said base structure above said idling rollers.

19. A framework for a belt conveyor as claimed in claim 18 wherein the outer end of the support member is bifurcated, and an idling roller is mounted between its bifurcated arms and over which idling roller the lower flight of said belt conveyor passes.

20. A framework for a belt conveyor comprising a base structure having a three point mounting arrangement in which the mountings are in a substantial triangular displacement with one upper and two lower mountings, a boom structure at an inward end pivotally connected to said base structure through said three mountings, said boom structure including an elongate boom member and an elongate support member being pivoted to one of said lower mountings, said support member underlying said boom member and towards its mounted inward end being cranked outwardly and at its outer end pivotally connected to said boom structure, a mounting plate mounted near the crank, a ram and cylinder arrangement connected between said mounting plate and the second of said lower mountings, said mountings being displayed angularly to enable the boom structure to be capable of articulation between an outboard generally horizontal orientation and an inboard substantially vertical orientation, wherein the outer end of said boom member is bifurcated, said framework further comprising a conveyor roller mounted between outer ends of bifurcated arms, said roller being mounted transversely of said boom member.

* * * * *